(12) United States Patent
Mori et al.

(10) Patent No.: US 11,942,275 B2
(45) Date of Patent: Mar. 26, 2024

(54) BUSBAR STRUCTURE FOR CAPACITOR

(71) Applicant: NICHICON CORPORATION, Kyoto (JP)

(72) Inventors: Takashi Mori, Kyoto (JP); Yasuyuki Murakami, Kyoto (JP)

(73) Assignee: Nichicon Corporation, Kyoto (JP)

( * ) Notice: Subject to any disclaimer, the term of this patent is extended or adjusted under 35 U.S.C. 154(b) by 65 days.

(21) Appl. No.: 17/784,750

(22) PCT Filed: Mar. 4, 2021

(86) PCT No.: PCT/JP2021/008386
§ 371 (c)(1),
(2) Date: Jun. 13, 2022

(87) PCT Pub. No.: WO2021/182282
PCT Pub. Date: Sep. 16, 2021

(65) Prior Publication Data
US 2023/0009591 A1   Jan. 12, 2023

(30) Foreign Application Priority Data
Mar. 10, 2020 (JP) .................................. 2020-040539

(51) Int. Cl.
*H01G 4/228* (2006.01)
*H01G 2/06* (2006.01)
*H01G 4/32* (2006.01)

(52) U.S. Cl.
CPC ............... *H01G 4/228* (2013.01); *H01G 4/32* (2013.01); *H01G 2/06* (2013.01)

(58) Field of Classification Search
CPC .................................. H01G 4/228; H01G 4/35
See application file for complete search history.

(56) References Cited

U.S. PATENT DOCUMENTS

| 8,422,244 B2 | 4/2013 | Azuma et al. |
| 2017/0338041 A1* | 11/2017 | Lei .......................... B60L 3/003 |
| 2018/0233285 A1 | 8/2018 | Shinya et al. |

FOREIGN PATENT DOCUMENTS

| JP | 7-3234 | 1/1995 |
| JP | 2007-143272 A | 6/2007 |
| JP | 2010-251400 A | 11/2010 |
| JP | 2018-37433 A | 3/2018 |
| JP | 2019-169703 A | 10/2019 |
| WO | WO-2019101802 A1 * | 5/2019 ............... H01G 2/02 |

* cited by examiner

*Primary Examiner* — Eric W Thomas
(74) *Attorney, Agent, or Firm* — Norris McLaughlin, P.A.

(57) ABSTRACT

The insulating plate has a swelling protruding in a first direction that is a direction a first plate portion toward a second plate portion. The swelling is formed integral with the insulating plate. The first plate portion has a first fitting part protruding in the first direction and formed integral with this plate portion. The first fitting part is fitted, in the first direction, onto one surface side of the swelling of the insulating plate. The second plate portion has a second fitting part protruding in the first direction and formed integral with this plate portion. The second fitting part is fitted, in a second direction opposite to the first direction, onto the other surface side of the swelling.

7 Claims, 6 Drawing Sheets

BUSBAR STRUCTURE FOR CAPACITOR

TECHNICAL FIELD

This invention relates to a busbar structure for use in a capacitor including: a capacitor element; a first and a second busbars each having first and second opposing plate portions; and an insulating plate, and is further characterized in that base ends of the first and second busbars are connected to electrodes of the capacitor element, free end sides of the first and second busbars stand upright in adjacency and in parallel to each other, constituting the first and second plate portions, and the insulating plate is held between the opposing plate portions.

BACKGROUND ART

Two busbars respectively having P polarity (positive electrode) and N polarity (negative electrode) and disposed in a pair may each include an electrically conductive, thin metal plate. To meet the demands for lower inductance and downsizing, opposing plate portions of these busbars may be often disposed in close proximity against each other. A pair of P and N terminals for external connection on a free end side of the opposing plate portions may be mechanically and electrically joined to terminals for cable connection extended from an external electric device. Conventionally, an insulating plate may be fitted into an interval between the opposing plate portions to ensure that these portions are certainly insulated from each other. On the other hand, an adequate creepage distance should desirably be secured in order to avoid the occurrence of insulation breakdown.

The terminals for external connection to be joined to the terminals for cable connection may be spaced away from the base ends of the busbars embedded in a mold resin and may be accordingly subject to a large moment under the action of an external force. What is more, the busbars are very thin, plate-like members.

The busbar thus made of the electrically conductive, thin metal plate, may be likely to deform, for example, warp or bend, in directions perpendicular relative to its plate surface.

A known technique for high precision in relative positioning of the paired busbars and the insulating plate is to form projections on front and back surfaces of the insulating plate and insert the projections into holes of the opposing plate portions, so that these three members are securely located (see, for example, patent document 1).

CITATION LIST

Patent Document

Patent document 1: JP 2010-251400 A (U.S. Pat. No. 5,391,797)

SUMMARY OF INVENTION

Technical Problem

In the capacitor described in patent document 1, the projections formed on the insulating plate are simply fitted into the holes of the opposing plate portions. The capacitor thus structured, however, may often result in a poor fitting strength. As a result, the members disposed in close proximity; insulating plate and two opposing plate portions, may have a lower natural frequency and may accordingly degrade in vibration resistance. Another possible problem with such a capacitor is that the projections, if improperly fitted into the holes, may accidentally fall out in directions perpendicular to the plate surface, leading to a poor positional accuracy.

For relative positioning of the insulating plate and opposing plate portions, fasteners, like bolts or nuts, are possibly used to positionally fix these three members in directions perpendicular to the plate surface. Fastening them using such fasteners, however, may not only complicate the production process but also invite a higher risk of the thin opposing plate portions being deformed, ultimately deteriorating the positional accuracy rather than improving it.

This invention was accomplished to address these issues of the known art and is directed to, in relation to capacitors formed by molding, providing solutions to accurately and certainly locate two opposing plate portions and an insulating plate in a simplified structure and to achieve an enhanced fitting strength and an improved vibration resistance.

Technical Solution

To this end, this invention provides the following technical features.

A busbar structure for use in a capacitor, comprising:
a capacitor element;
a first busbar and a second busbar disposed in a pair and each having a plate-like shape, the first busbar and the second busbar having different polarities and respectively including first and second plate portions that are disposed against and in parallel to each other; and
an insulating plate held between the opposing plate portions,
the insulating plate including a swelling that protrudes in a first direction that is a direction from the first plate portion toward the second plate portion, the swelling being integral with the insulating plate,
the first plate portion having a first fitting part that protrudes in the first direction, the first fitting part being integral with the first plate portion and allowed to fit onto one surface side of the swelling of the insulating plate in the first direction,
the second plate portion having a second fitting part that protrudes in the first direction, the second fitting part being integral with the second plate portion and allowed to fit onto another surface side of the swelling of the insulating plate in a second direction opposite to the first direction.

The technical features described herein according to this invention may provide the following technical effects.

The first fitting part is formed integral with the first plate portion of the first busbar in a manner that protrudes in the first direction. The first fitting part is fitted, in the first direction, onto one surface side of the swelling integral with the insulating plate. The second fitting part is formed integral with the second plate portion of the second busbar in a manner that protrudes in the second direction. The second fitting part is fitted, in the second direction, onto the other surface side of the swelling integral with the insulating plate.

The direction of the first fitting part being fitted onto one surface side of the swelling of the insulating plate (first direction) is a direction opposite to the direction of the second fitting part being fitted onto the other surface side of the swelling of the insulating plate (second direction).

By thus fitting the first and second fitting parts into the same swelling, surfaces of the swelling on both sides are held between and supported by these fitting parts.

While the depth of the first fitting part fitted in the swelling of the insulating plate may be associated with the dimension of the swelling height, the dimension of the first fitting part may be not directly subject to any restrictions resulting from the plate thickness of the first plate portion. The depth of the first fitting part fitted in the swelling may increase with a greater dimension of the swelling height. Likewise, the depth of the second fitting part fitted in the swelling of the insulating plate may be associated with the dimension of the swelling height, however, the dimension of the second fitting part may be not directly subject to any restrictions resulting from the plate thickness of the second plate portion. The depth of the second fitting part fitted in the swelling may increase with a greater dimension of the swelling height, and the dimension of the swelling height may be not directly subject to any restrictions resulting from the plate thicknesses of the first or second plate portion. Thus, an adequately large fitting area may be secured for contact between the swelling of the insulating plate and the first fitting part of the first plate portion (area of contact) and for contact between the swelling of the insulating plate and the second fitting part of the second plate portion (area of contact).

A suitable dimension of the swelling height, as well as two surfaces of the swelling being tightly held, may offer an adequately large fitting strength when the first and second fitting parts are fitted in the swelling.

Thus, the members disposed in close proximity including the first and second plate portions may be stabilized with an improved fitting strength. This may allow these members to have a higher natural frequency and may accordingly control possible resonance to relatively low frequency vibrations transmitted from outside, leading to an improved vibration resistance.

This invention may include, other than the aspects described thus far, other various aspects and modified examples. The busbar structure for capacitor described herein may be configured as described below.

1] According to an aspect, the swelling of the insulating plate includes a tubular portion, an outer circumferential surface of the first fitting part of the first plate portion is allowed to fit onto an inner circumferential surface of the tubular portion, and an inner circumferential surface of the second fitting part of the second plate portion is allowed to fit onto an outer circumferential surface of the tubular portion.

This may allow the fitting strength to further improve when the first and second fitting parts are fitted in the swelling. The tubular portion may be covered so that its lower end in the direction of swelling (first direction) is closed or may be left uncovered with its lower end being left open.

The tubular portion with a closed lower end may easily allow an adequate distance for insulation (creeping distance) between the first and second plate portions having different polarities. Optionally, the tubular portion may be uncovered unless an adequate distance for insulation fails to be secured.

The aspects 2] to 5] described below provide structural features that may further assure an adequate fitting area so that the first, second fitting part of the first, second plate portion may be more securely fitted in the swelling of the insulating plate.

2] According to an aspect, the swelling of the insulating plate includes: an annular portion having a C-like shape with an opening in the second direction when axially viewed in cross section, a bottom-closed recess with an opening in the first direction on an inner side of the annular portion; and an annular recess with an opening in the second direction. The first fitting part of the first plate portion is fitted into the annular recess of the annular portion with an opening in the second direction, and the second fitting part of the second plate portion is fitted onto an inner circumferential surface of the bottom-closed recess with an opening in the first direction.

In this aspect, the first fitting part of the first plate portion and the second fitting part of the second plate portion collaborate with each other to radially hold and support the interfacial part between the bottom-closed recess and the annular recess of the insulating plate.

3] According to an aspect, the second fitting part is internally fitted into the bottom-closed recess.

4] According to an aspect, the first fitting part is fitted, both internally and externally, into the annular recess of the annular portion, instead of being simply fitted externally into this recess. This may promise a greater fitting area and a greater holding strength, leading to an increased fitting strength, and may also ensure further improvement of the vibration resistance through higher natural frequencies.

5] According to an aspect, the first and second fitting parts are formed by burring. The burring may provide a greater fitting area for the swelling than an area that would be provided by the inner circumferential surface of a simple through hole alone (as thick as the plate portion), thereby achieving an enhanced fitting strength.

Advantageous Effects

According to this invention, the members disposed in close proximity, including the insulating plate and the first and second plate portions, may be allowed to fit into one another with a greater fitting strength and may be thereby allowed to have a higher natural frequency. This may effectively control resonance to relatively low frequency vibrations transmitted from outside, leading to an improved vibration resistance.

DESCRIPTION OF EMBODIMENTS

The busbar structure for capacitor described herein are more specifically described below based on different examples of this invention.

First Example

Figure 1:
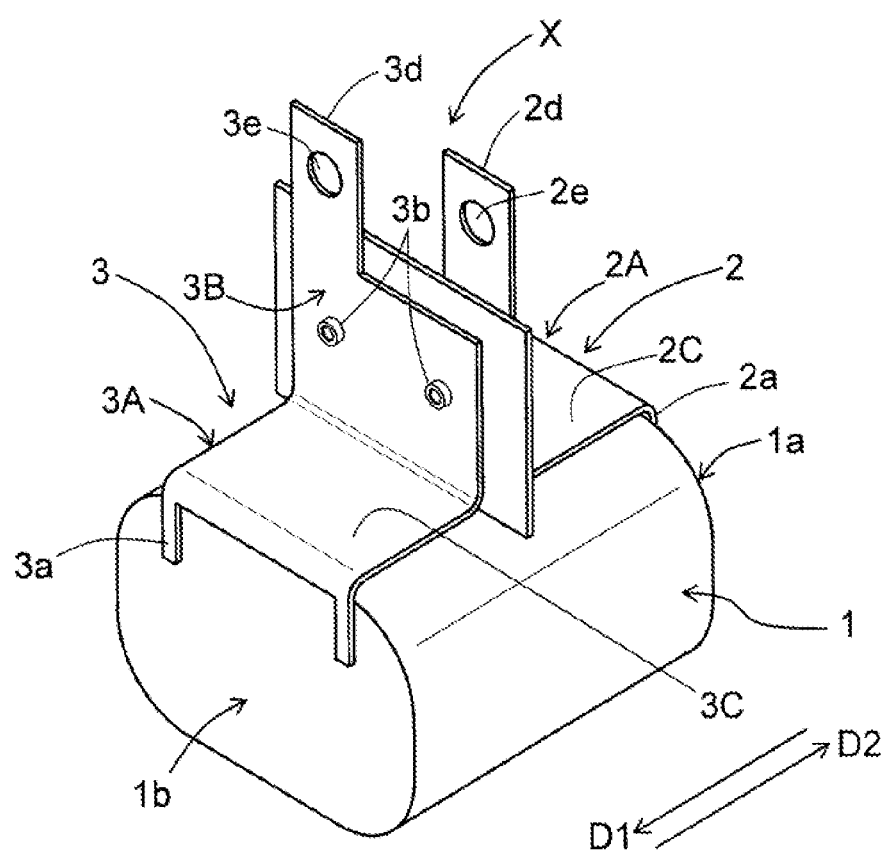
FIG. 1 is a perspective view of a capacitor element unit having a busbar structure for capacitor according to examples of this invention.
Figure 2:
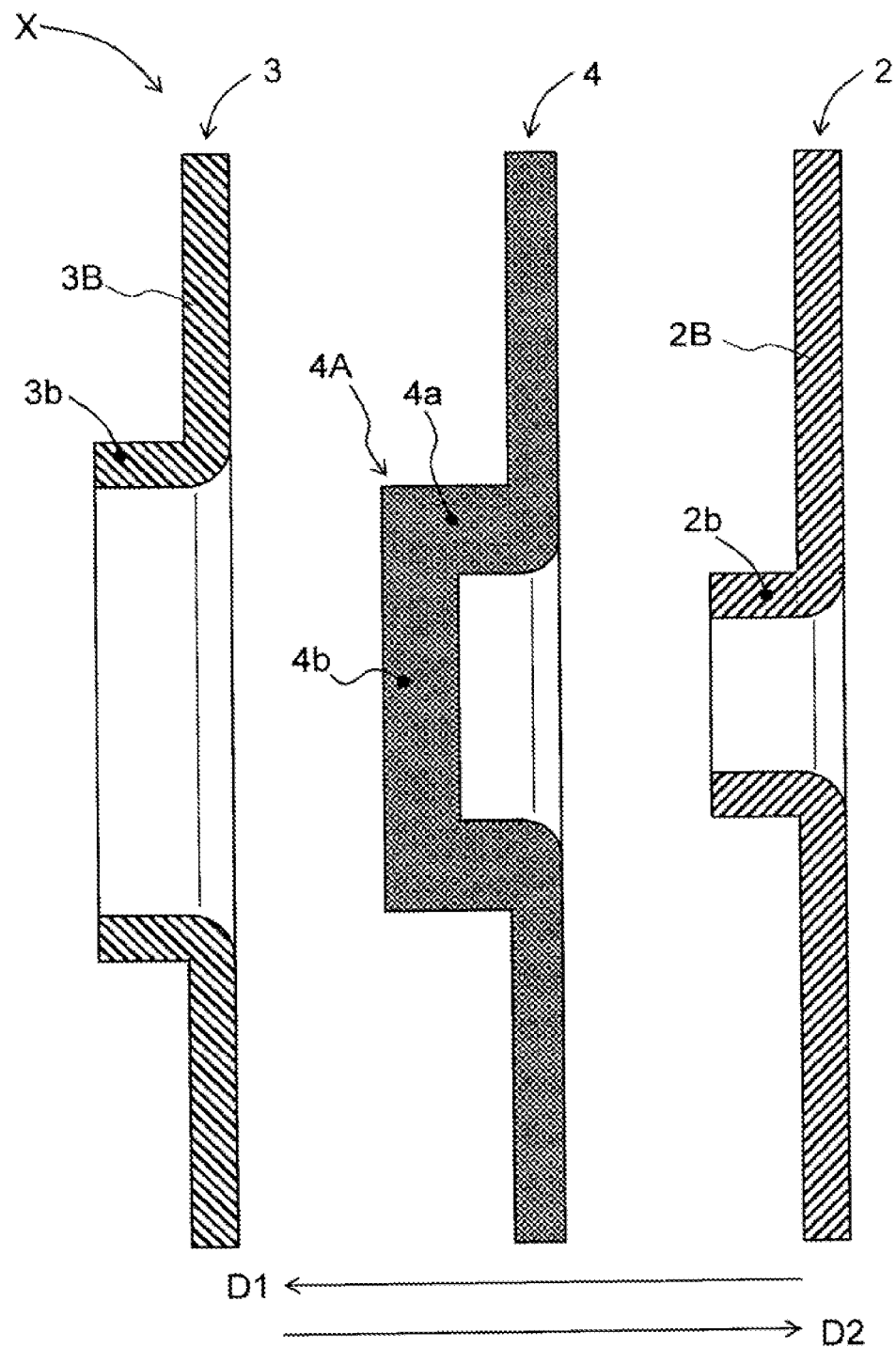
FIG. 2 is an exploded view in cross section of structural components of a busbar structure for capacitor according to a first example of this invention.
Figure 3:
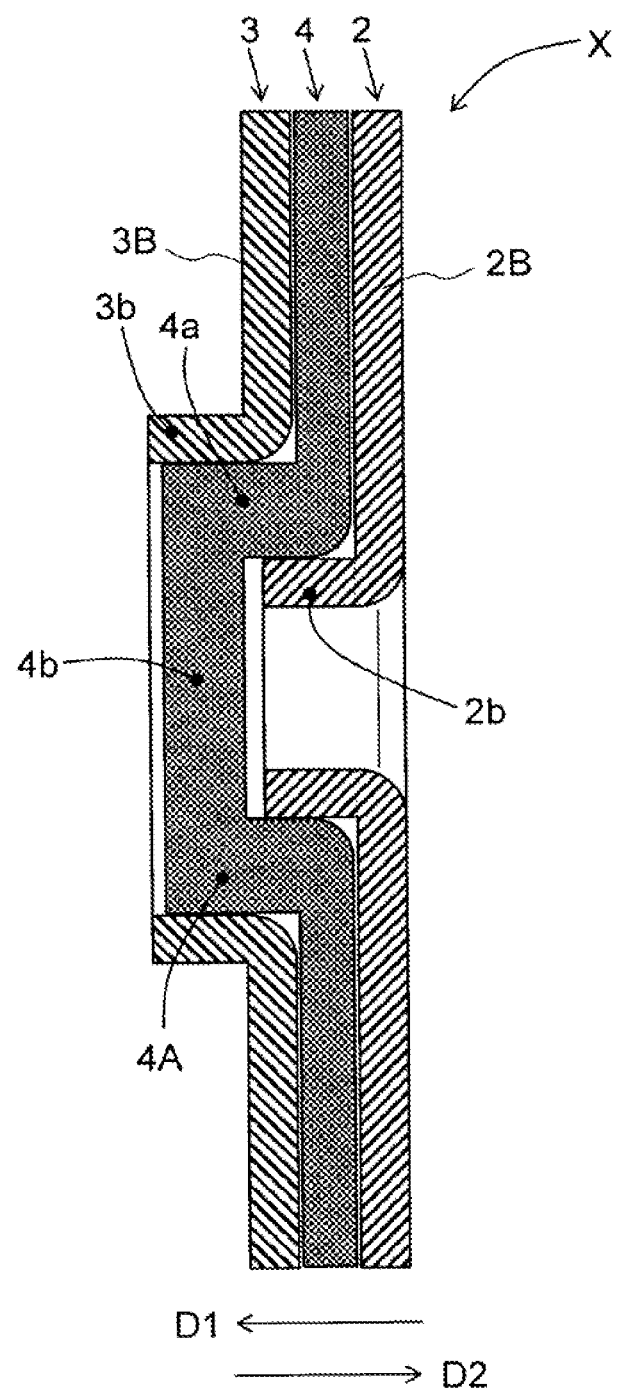
FIG. 3 is a cross-sectional view of the busbar structure for capacitor according to the first example.

In FIGS. 1 to 3 are illustrated a capacitor element 1, electrodes 1a and 1b having different polarities disposed at axial both ends of the capacitor element 1, a first busbar 2, a second busbar 3, a first body plate 2A of the first busbar 2, a second body plate 3A of the second busbar 3, a first plate portion 2B which is one of opposing plate portions, and a second plate portion 3B which is the other one of the opposing plate portions. The body plates 2A and 3A have an L-like bent shape. The opposing plate portions 2B and 3B, which are part of the body plates 2A and 3A, are disposed in adjacency and stand upright in parallel to each other. In these drawings are further illustrated a first fitting part (burred part) of the first plate portion 2B, a second fitting part (burred part) of the second plate portion 3B, an insulating plate 4, a swelling 4A of the insulating plate 4 (covered tubular portion in FIGS. 2 and 3), a first direction D1, and a second direction D2.

As illustrated in FIG. 1, the capacitor element 1 has, on its axial end surfaces on both sides, a pair of electrodes 1a and 1b respectively having P and N polarities. The first and second busbars 2 and 3 include plate-shaped conductors having different polarities. The first and second busbars 2 and 3 respectively have, at their base ends, protruding pieces 2a and 3a for connecting purpose, and these protruding pieces are electrically and mechanically joined by soldering to the electrodes 1a and 1b.

The first and second body plates 2A and 3A of the first and second busbars 2 and 3 are each bent through 90 degrees and stand upright in adjacency and in parallel to each other, constituting the first and second opposing plate portions 2B and 3B. The first and second body plates 2A and 3A include horizontal plate portions 2C and 3C, and these plate portions are disposed along a substantially flat upper surface of the capacitor element 1. The flat insulating plate 4 is fixedly disposed in a narrow interval between the first and second opposing plate portions 2B and 3B in adjacency and in parallel to each other. The opposing plate portions 2B and 3B respectively have tongue-shaped terminals 2d and 3d for external connection. These terminals 2d and 3d are extending from upper edges of the plate portions 2B and 3B and stand at positions very close to but far enough from each other to avoid any contact. The terminals 2d and 3d for external connection have screw insertion holes (fastening holes) 2e and 3e that allow these terminals to be fastened to terminals for cable connection of an external electric device.

The insulating plate 4 between the first and second opposing plate portions 2B and 3B is extending more outward than outer edges of the first and second plate portions 2B and 3B to provide an adequate creeping distance between these plate portions.

The insulating plate 4 and the first and second opposing plate portions 2B and 3B of the first and second busbars 2 and 3 may be collectively called a group of adjacent members X. Structural features of this group of adjacent members X are hereinafter described in detail.

A first direction D1 refers to a direction from the first plate portion 2B of the first busbar 2 toward the second plate portion 3B of the second busbar 3 (horizontal direction), and a second direction D2 refers to a direction opposite to the first direction D1.

As illustrated in FIG. 2, the insulating plate 4 disposed between the opposing plate portions 2B and 3B has a swelling 4A that protrudes in the first direction D1. This swelling 4A is a covered tubular portion formed integral with this insulating plate 4. The covered tubular portion (4A) includes a tubular portion 4a and a cover 4b that are integral with each other. The tubular portion 4a is integral with the body of the insulating plate 4, and a lower end of the tubular portion 4a in the direction of swelling (first direction D1) is closed with the cover 4b. The tubular portion 4a may conventionally have a cylindrical shape but is not necessarily limited to such a shape. Other examples of the shape may include elliptic cylinders and angular tubes.

The first plate portion 2B of the first busbar 2 has a tubular first fitting part 2b. This first fitting part 2b is formed so as to penetrate through in the first direction D1 and to be integral with this first plate portion 2B. The first fitting part 2b is obtained by burring a thin, plate-shaped conductor constituting the first busbar 2. A through hole is formed in the thin, plate-shaped conductor using a drilling tool, so that an opening-formed tubular part (burred part) is left around the through hole to be integral with the conductor. As illustrated in FIG. 3, the outer circumferential surface of the tubular first fitting part 2b is internally fitted onto the whole inner circumferential surface of the tubular portion 4a of the swelling 4A in the insulating plate 4. The axial dimension of the first fitting part 2b is greater than the thickness of the first plate portion 2B.

The second plate portion 3B of the second busbar 3 has a tubular second fitting part 3b. The second fitting part 3b is formed so as to penetrate through in the first direction D1 and to be integral with this plate portion 3B. In a manner similar to the first fitting part 2b, the second fitting part 3b is obtained by burring a thin, plate-shaped conductor constituting the second busbar 3. The inner circumferential surface of the tubular second fitting part 3b is externally fitted onto the whole outer circumferential surface of the tubular portion 4a of the swelling 4A in the insulating plate 4. The axial dimension of the second fitting part 3b is greater than the thickness of the second plate portion 3B.

The burring may provide a greater fitting area for the swelling 4A than an area that would be obtained by the inner circumferential surface of a simple through hole alone (as thick as the plate portions), thereby achieving an enhanced fitting strength.

The three members thus characterized (insulating plate 4 and first and second busbars 2 and 3) are assembled as described below.

As illustrated in FIG. 3, the tubular first fitting part 2b of the first plate portion 2B is fitted, in the first direction D1, onto one surface side of the tubular portion 4a of the swelling 4A in the insulating plate 4, in which the outer circumferential surface of the first fitting part 2b is internally and closely fitted onto the whole inner circumferential surface of the tubular portion 4a of the swelling 4A. The fitting depth then is greater than the thickness of the first plate portion 2B. Thus, the fitting area may be increased and the fitting strength may be thereby improved, as compared with the known art that does not employ burring but uses the inner circumferential surface of a simple through hole alone (as thick as the plate portion) for the fitting part to be fitted.

The tubular second fitting part 3b of the second plate portion 3B is fitted, in the second direction D2, onto the other surface side of the tubular portion 4a of the swelling 4A in the insulating plate 4, in which the inner circumferential surface of the second fitting part 3b is externally and closely fitted onto the whole outer circumferential surface of the tubular portion 4a of the swelling 4A. The fitting depth then is greater than the thickness of the second plate portion 3B. Thus, the fitting area may be increased and the fitting strength may be thereby improved, as compared with the known art that does not employ burring but uses the inner circumferential surface of a simple through hole alone (as thick as the plate portion) for the fitting part to be fitted.

Figure 4:
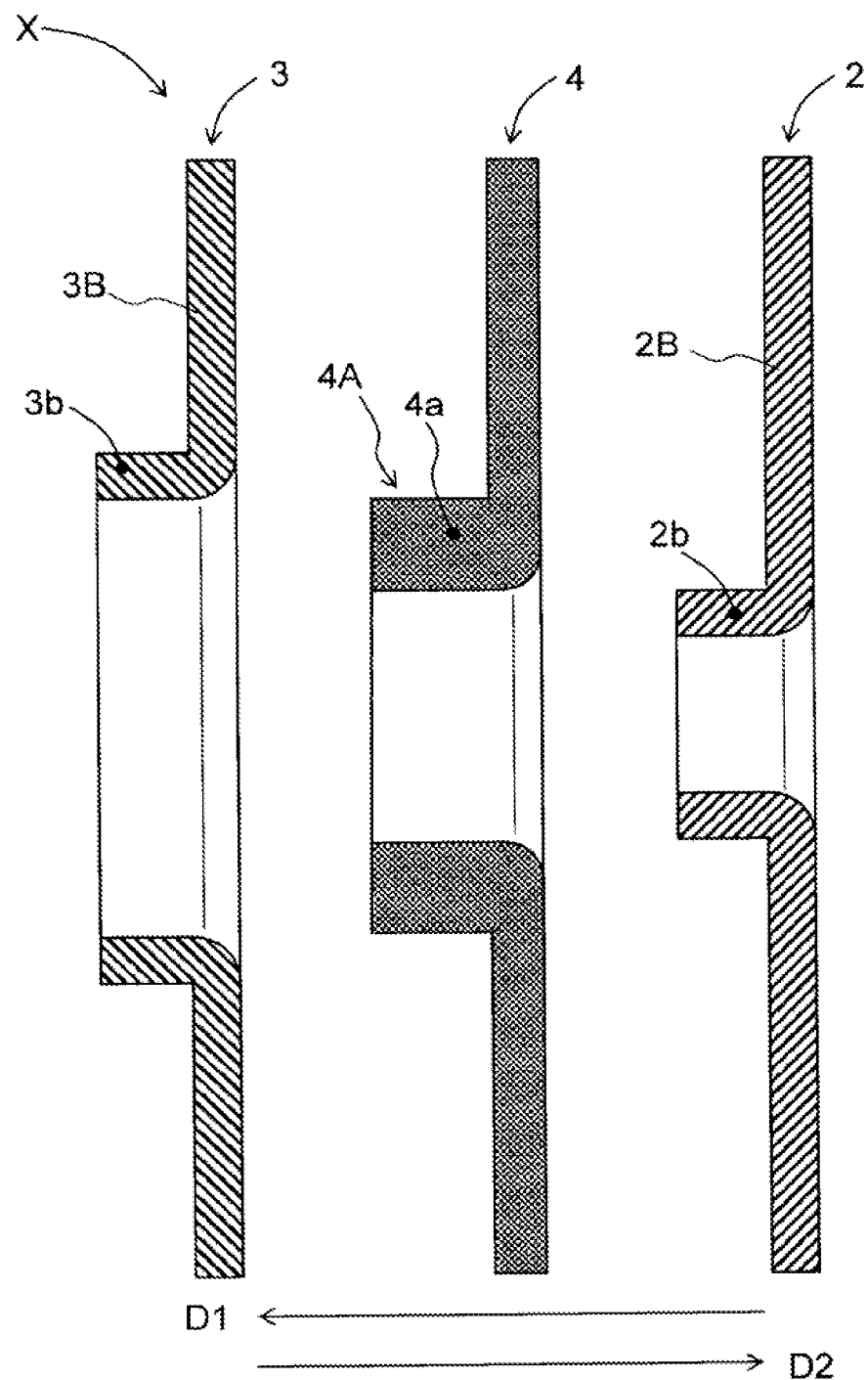
FIG. 4 is a cross-sectional view of a busbar structure for capacitor according to a modified example of the first example.

Unless an adequate distance for insulation (creeping distance) fails to be secured between the heteropolar first and second plate portions 2B and 3B, the swelling may include, instead of the covered tubular portion, an uncovered tubular portion (with no cover 4b) illustrated in FIG. 4. The covered tubular portion, however, may be more effective for preventing the strength of the swelling 4A from degrading and for keeping an adequate distance for insulation between the heteropolar first and second plate portions 2B and 3B.

Second Example

Figure 5:
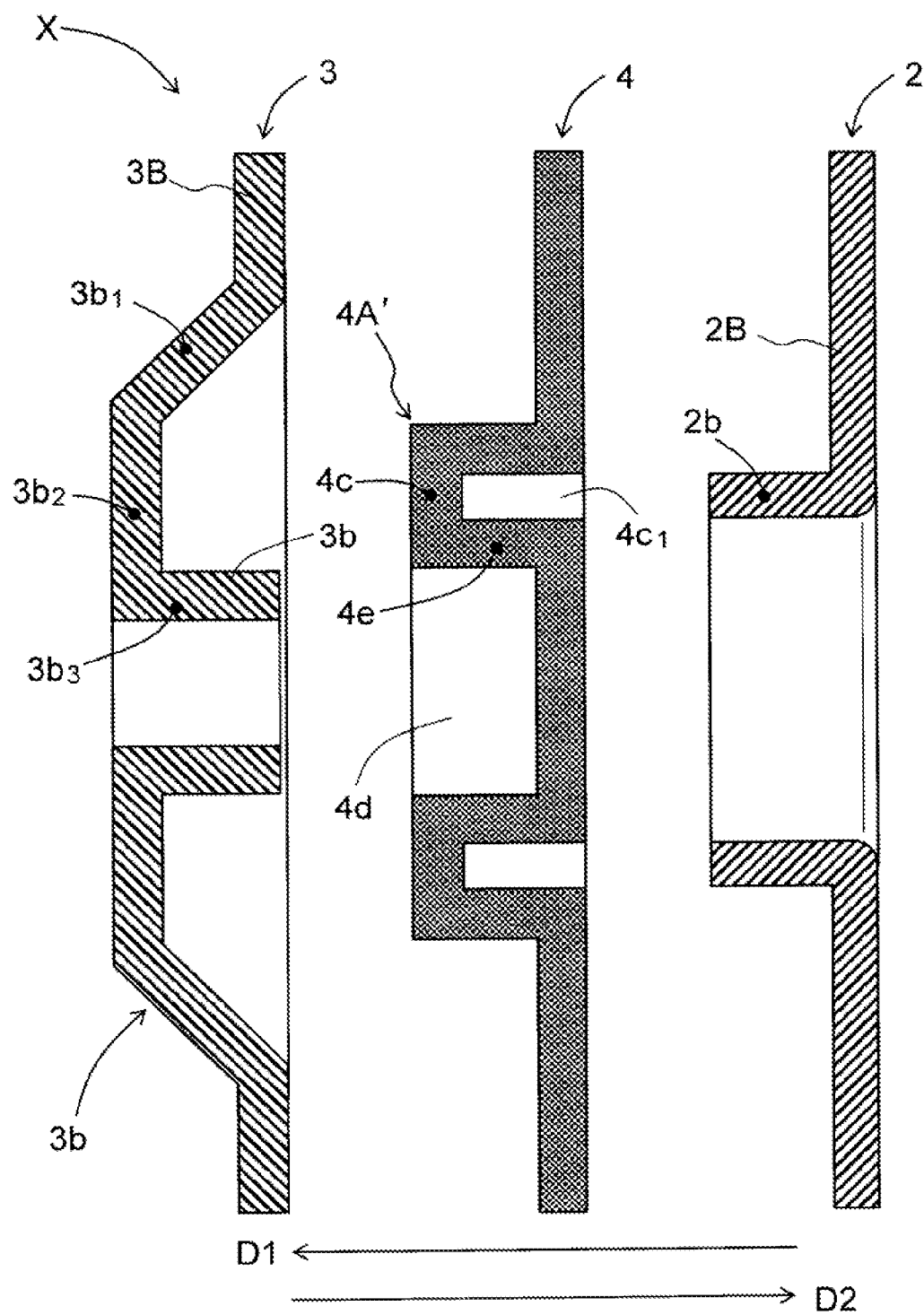
FIG. 5 is an exploded view in cross section of structural components of a busbar structure for capacitor according to a second example of this invention.
Figure 6:
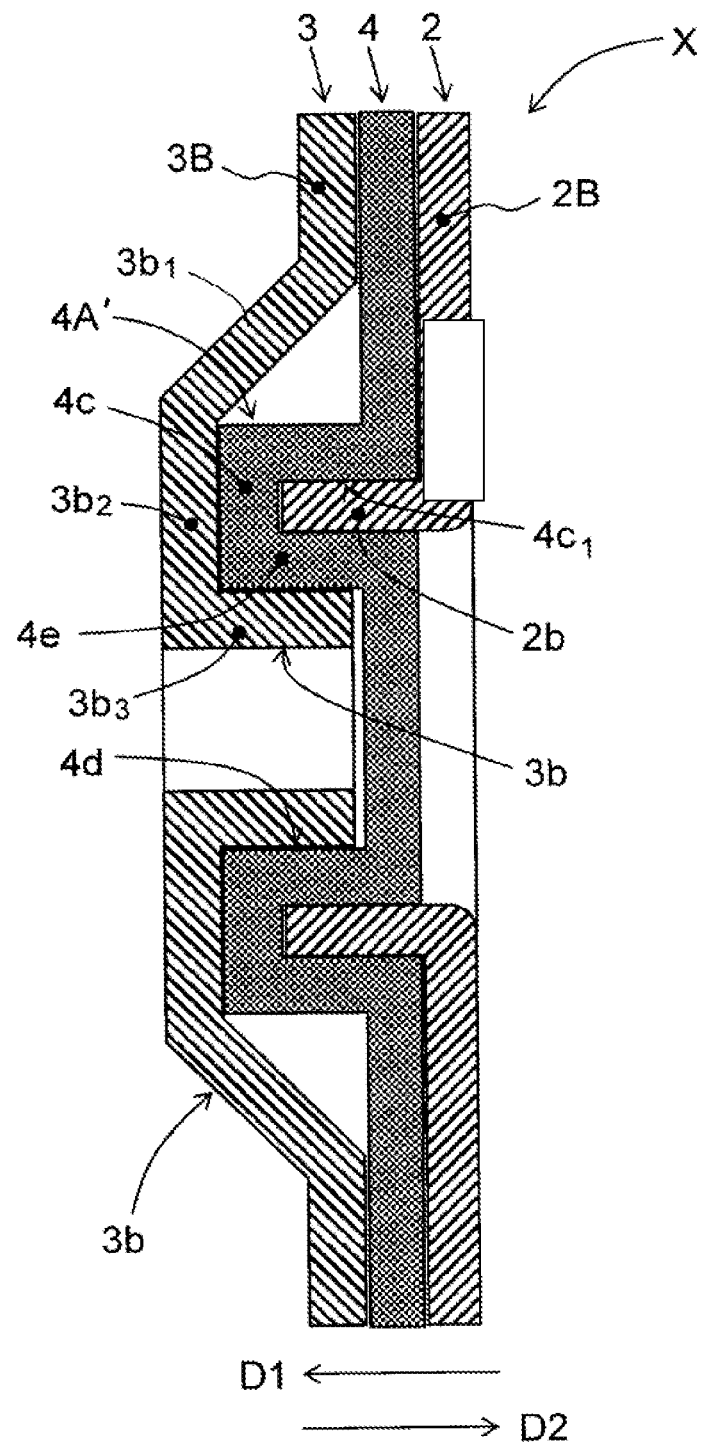
FIG. 6 is a cross-sectional view of the busbar structure for capacitor according to the second example.

The following structural elements are illustrated in FIGS. 5 and 6 of a second example of this invention; a conical part $3b_1$, a top plate part $3b_2$, a tubular part $3b_3$ of the second fitting part 3b, a swelling 4A' of the insulating plate 4, and an annular portion 4c, an annular recess $4c_1$, a bottom-closed recess 4d, and a peripheral wall 4e of the swelling 4A'. Any other components are similar to those described in the first example. The same reference signs of FIGS. 5 and 6 as those illustrated in FIGS. 1 to 3 of the first example refer to the same components and will not be described again in detail.

In the first example, the first fitting part 2b of the first plate portion 2B is internally fitted in the swelling 4A of the insulating plate 4, while the second fitting part 3b of the second plate portion 3B is externally in the swelling 4A of the insulating plate 4.

In the second example that differs from the first example, the swelling 4A' of the insulating plate 4 has, in cross section, the annular portion 4c and the bottom-closed recess 4d at the center (protrusion-recess-protrusion), the tubular first fitting part 2b of the first plate portion 2B is internally and externally fitted into the annular recess $4c_1$ of the annular portion 4c in the swelling 4A', and the tubular part $3b_3$ extending in the second direction D2 of the tubular second fitting part 3b in the second plate portion 3B is internally fitted into the bottom-closed recess 4d. This example is hereinafter described in detail.

As illustrated in FIG. 5, the swelling 4A' of the insulating plate 4 includes an annular portion 4c having a C-like shape with an opening in the second direction D2 when axially viewed in cross section, and further includes a bottom-closed recess 4d with an opening in the first direction D1 on an inner side than the annular portion 4c and an annular recess with an opening in the second direction D2. This swelling has, on the whole, an irregular shape (protrusion-recess protrusion) in cross section.

As illustrated in FIG. 6, the annular portion 4c has the annular recess $4C_1$ with an opening in the second direction D2. The tubular first fitting part 2b of the first plate portion 2B is fitted into the annular recess $4c_1$, and the tubular second fitting part 3b of the second plate portion 3b is fitted onto the inner circumferential surface of the bottom-closed recess 4d with an opening in the first direction D1. The first fitting part 2b is fitted, both internally and externally, into the annular recess $4c_1$, while the second fitting part 3b is internally fitted into the bottom-closed recess 4d. The first and second fitting parts 2b and 3b collaborate with each other to radially hold and support the peripheral wall 4e between the annular recess $4c_1$ and the bottom-closed recess 4d of the insulating plate 4.

In this instance, the first fitting part 2b is fitted, both internally and externally, into the annular recess $4c_1$ instead of being simply fitted externally into this recess. This may promise a greater fitting area and a greater holding strength, leading to an increased fitting strength, and may also ensure further improvement of the vibration resistance through higher natural frequencies.

In this example, the group of adjacent members X; the insulating plate 4 and the first and second plate portions 2B and 3B thus improved in fitting strength, may be allowed to have a higher natural frequency. This may improve the natural frequency of these members and may accordingly control possible resonance to relatively low frequency vibrations transmitted from outside, leading to an improved vibration resistance.

INDUSTRIAL APPLICABILITY

This invention provides an advantageous technology that may allow opposing plate portions and an insulating plate to be accurately and certainly positioned in a simplified structure and that may offer a greater fitting strength and an improved vibration resistance.

REFERENCE SIGNS LIST 1 capacitor element
1a, 1b electrode
1c upper surface of capacitor element
2 first busbar
2B first plate portion
2b first fitting part (burred part)
3 second busbar
3B second plate portion
3b second fitting part (burred part)
4 insulating plate
4A swelling (covered or uncovered tubular portion)
4A' swelling (irregular shape)
4c annular portion
$4c_1$ annular recess
4d bottom-closed recess
D1 first direction
D2 second direction

The invention claimed is:
1. A busbar structure for use in a capacitor, comprising:
a capacitor element
a first busbar and a second busbar disposed in a pair and each having a plate-like shape, the first busbar and the second busbar having different polarities and respectively comprising first and second plate portions that are disposed against and in parallel to each other, and
an insulating plate held between the opposing plate portions,
the insulating plate comprising a swelling that protrudes in a first direction that is a direction from the first plate portion toward the second plate portion, the swelling being integral with the insulating plate,
the first plate portion comprising a first fitting part that protrudes in the first direction, the first fitting part being integral with the first plate portion and allowed to fit onto one surface side of the swelling of the insulating plate in the first direction,
the second plate portion comprising a second fitting part that protrudes in the first direction, the second fitting part being integral with the second plate portion and allowed to fit onto another surface side of the swelling of the insulating plate in a second direction opposite to the first direction,
wherein
the swelling of the insulating plate comprises a tubular portion,
an outer circumferential surface of the first fitting part of the first plate portion is allowed to fit onto an inner circumferential surface of the tubular portion, and an inner circumferential surface of the second fitting part of the second plate portion is allowed to fit onto an outer circumferential surface of the tubular portion.

2. The busbar structure according to claim 1, wherein the first and second fitting parts are formed by burring.

3. A busbar structure for use in a capacitor, comprising:

a capacitor element a first busbar and a second busbar disposed in a pair and each having a plate-like shape, the first busbar and the second busbar having different polarities and respectively comprising first and second plate portions that are disposed against and in parallel to each other; and an insulating plate held between the opposing plate portions, the insulating plate comprising a swelling that protrudes in a first direction that is a direction from the first plate portion toward the second plate portion, the swelling being integral with the insulating plate, the first plate portion comprising a first fitting part that protrudes in the first direction, the first fitting part being integral with the first plate portion and allowed to fit onto one surface side of the swelling of the insulating plate in the first direction, the second plate portion comprising a second fitting part that protrudes in the first direction, the second fitting part being integral with the second plate portion and allowed to fit onto another surface side of the swelling of the insulating plate in a second direction opposite to the first direction, wherein the swelling of the insulating plate comprises:

an annular portion having a C-like shape with an opening in the second direction when axially viewed in cross section;

a bottom-closed recess with an opening in the first direction on an inner side than the annular portion; and an annular recess with an opening in the second direction, the first fitting part of the first plate portion is fitted into the annular recess of the annular portion with an opening in the second direction, and the second fitting part of the second plate portion is fitted onto an inner circumferential surface of the bottom-closed recess with an opening in the first direction.

4. The busbar structure according to claim 3, wherein the second fitting part is internally fitted into the bottom-closed recess.

5. The busbar structure according to claim 4, wherein the first fitting part is fitted, both internally and externally, into the annular recess of the annular portion.

6. The busbar structure according to claim 3, wherein the first fitting part is fitted, both internally and externally, into the annular recess of the annular portion.

7. The busbar structure according to claim 3, wherein the first and second fitting parts are formed by burring.

* * * * *